US007321318B2

(12) United States Patent  
Crane et al.

(10) Patent No.: US 7,321,318 B2
(45) Date of Patent: Jan. 22, 2008

(54) METHODS AND SYSTEMS FOR CONTROLLING THE DISPLAY OF INFORMATION AT AN AIRCRAFT FLIGHT DECK

(75) Inventors: Jean M. Crane, Seattle, WA (US); David A. Green, Seattle, WA (US); John Wiedemann, Seattle, WA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 10/815,034

(22) Filed: Mar. 31, 2004

(65) Prior Publication Data

US 2005/0231390 A1 Oct. 20, 2005

(51) Int. Cl.
*G01C 21/00* (2006.01)

(52) U.S. Cl. ............... 340/971; 340/973; 345/619; 345/649; 701/14; 715/861

(58) Field of Classification Search ........... 340/971, 340/973, 963, 945, 979; 356/141.1, 28.5; 345/788, 790, 156, 619, 649; 701/5, 11, 701/14, 200; 715/856, 857, 861, 710, 771
See application file for complete search history.

(56) References Cited

U.S. PATENT DOCUMENTS

| 3,191,147 A | 6/1965 | Majendie |
| 4,196,474 A | 4/1980 | Buchanan et al. |
| 4,212,064 A | 7/1980 | Forsythe |
| 4,247,843 A | 1/1981 | Miller |
| 4,274,096 A | 6/1981 | Dennnison |
| 4,325,123 A | 4/1982 | Graham |
| 4,471,439 A | 9/1984 | Robbins et al. |
| H000139 H | 10/1986 | Task |
| 4,631,678 A | 12/1986 | Angermuller et al. |
| 4,729,102 A | 3/1988 | Miller, Jr. et al. |
| 4,792,906 A | 12/1988 | King |

(Continued)

FOREIGN PATENT DOCUMENTS

DE 3315386 A 10/1984

(Continued)

OTHER PUBLICATIONS

Peugeot 406 Handbook, Automobiles Peugeot, Paris, France, May 14, 1998 (pp. 30 and 38).

(Continued)

*Primary Examiner*—Davetta W. Goins
(74) *Attorney, Agent, or Firm*—Perkins Coie LLP

(57) ABSTRACT

Methods and systems for displaying aircraft operations information are disclosed. A method in accordance with one embodiment includes receiving operations information, presenting a first portion of the information over a first area of a display medium having a first size, receiving a signal corresponding to an instruction to increase a fraction of the display medium occupied by the operations information, and presenting at least the first portion of the operations information over a second, larger area of the display medium. Multiple display media can be controlled by independent selectors, with each selector having two portions, one to select categories of aircraft operations information, and another to present groups of selectable options corresponding to each of the individual categories of operations information.

32 Claims, 13 Drawing Sheets

U.S. PATENT DOCUMENTS

| | | |
|---|---|---|
| 4,860,007 A | 8/1989 | Konicke |
| 4,939,661 A | 7/1990 | Barker et al. |
| 5,050,081 A | 9/1991 | Abbott |
| 5,070,458 A | 12/1991 | Gilmore et al. |
| 5,243,339 A | 9/1993 | Graham et al. |
| 5,289,185 A | 2/1994 | Ramier et al. |
| 5,337,982 A | 8/1994 | Sherry |
| 5,416,705 A | 5/1995 | Barnett |
| 5,420,582 A | 5/1995 | Kubbat |
| 5,454,074 A | 9/1995 | Hartel |
| 5,475,594 A | 12/1995 | Oder et al. |
| 5,499,025 A | 3/1996 | Middleton et al. |
| 5,519,392 A | 5/1996 | Oder et al. |
| 5,523,949 A | 6/1996 | Agate et al. |
| 5,668,542 A | 9/1997 | Wright |
| 5,715,163 A | 2/1998 | Bang |
| 5,739,769 A | 4/1998 | Vladimir |
| 5,802,492 A | 9/1998 | DeLorme et al. |
| 5,844,503 A | 12/1998 | Riley et al. |
| 5,875,998 A | 3/1999 | Gleine |
| 5,916,297 A | 6/1999 | Griffin, III et al. |
| 5,940,013 A | 8/1999 | Vladimir et al. |
| 5,941,930 A | 8/1999 | Morimoto et al. |
| 5,971,318 A | 10/1999 | Lustre |
| 5,978,715 A | 11/1999 | Briffe |
| 5,983,158 A | 11/1999 | Suzuki et al. |
| 5,995,290 A | 11/1999 | Noble |
| 5,995,901 A | 11/1999 | Owen et al. |
| 6,038,498 A | 3/2000 | Briffe et al. |
| 6,057,786 A | 5/2000 | Briffe |
| 6,067,502 A | 5/2000 | Hayashida et al. |
| 6,072,473 A | 6/2000 | Muller et al. |
| 6,075,467 A | 6/2000 | Ninagawa et al. |
| 6,085,129 A | 7/2000 | Schardt |
| 6,098,014 A | 8/2000 | Kranz |
| 6,112,141 A | 8/2000 | Briffe |
| 6,118,385 A | 9/2000 | Leard |
| 6,154,151 A * | 11/2000 | McElreath et al. ......... 340/970 |
| 6,175,315 B1 | 1/2001 | Millard et al. |
| 6,188,937 B1 | 2/2001 | Sherry |
| 6,246,320 B1 | 6/2001 | Monroe |
| 6,262,720 B1 | 7/2001 | Jeffrey |
| 6,275,172 B1 | 8/2001 | Curtis et al. |
| 6,278,913 B1 | 8/2001 | Jiang |
| 6,313,759 B1 | 11/2001 | Musland-Sipper |
| 6,314,366 B1 | 11/2001 | Farmakis et al. |
| 6,335,694 B1 | 1/2002 | Beksa et al. |
| 6,346,892 B1 | 2/2002 | DeMers et al. |
| 6,362,750 B1 | 3/2002 | Castor |
| 6,381,519 B1 | 4/2002 | Snyder |
| 6,389,333 B1 | 5/2002 | Hansman |
| 6,405,975 B1 | 6/2002 | Sankrithi et al. |
| 6,424,909 B2 | 7/2002 | Kusano et al. |
| 6,443,399 B1 | 9/2002 | Yount et al. |
| 6,449,556 B1 | 9/2002 | Pauly |
| 6,466,235 B1 * | 10/2002 | Smith et al. ................ 715/771 |
| 6,473,675 B2 | 10/2002 | Sample |
| 6,512,527 B1 | 1/2003 | Barber et al. |
| 6,542,796 B1 | 4/2003 | Gibbs et al. |
| 6,556,902 B2 | 4/2003 | Ing et al. |
| 6,633,810 B1 | 10/2003 | Qureshi et al. |
| 6,636,786 B2 | 10/2003 | Partel |
| 6,668,215 B2 | 12/2003 | Lafon et al. |
| 6,690,299 B1 | 2/2004 | Suiter |
| 6,696,980 B1 | 2/2004 | Langner et al. |
| 6,697,718 B2 | 2/2004 | Le Draoullec et al. |
| 6,707,387 B2 * | 3/2004 | Noguchi et al. ......... 340/691.6 |
| 6,720,891 B2 | 4/2004 | Chen et al. |
| 6,745,113 B2 | 6/2004 | Griffin |
| 6,753,891 B1 * | 6/2004 | Chohan et al. ............. 715/790 |
| 6,784,869 B1 | 8/2004 | Clark et al. |
| 6,812,858 B2 | 11/2004 | Griffin, III |
| 6,816,780 B2 | 11/2004 | Naimer et al. |
| 6,856,864 B1 | 2/2005 | Gibbs et al. |
| 6,870,490 B2 | 3/2005 | Sherry et al. |
| 6,871,124 B1 | 3/2005 | McElreath |
| 6,898,492 B2 | 5/2005 | De Leon |
| 6,909,967 B2 | 6/2005 | Hirano et al. |
| 6,934,608 B2 | 8/2005 | Qureshi |
| 6,980,198 B1 * | 12/2005 | Gyde et al. ................. 345/157 |
| 6,992,596 B2 | 1/2006 | Cole et al. |
| 7,030,892 B1 | 4/2006 | Gyde et al. |
| 7,048,029 B2 | 5/2006 | Rieder et al. |
| 7,142,131 B2 | 11/2006 | Sikora |
| 2002/0033837 A1 * | 3/2002 | Munro ....................... 345/654 |
| 2003/0025719 A1 | 2/2003 | Palmer et al. |
| 2003/0058134 A1 | 3/2003 | Sherry |
| 2003/0132860 A1 | 7/2003 | Feyereisen |
| 2003/0225492 A1 | 12/2003 | Cope et al. |
| 2003/0229426 A1 | 12/2003 | Griffin |
| 2004/0004557 A1 | 1/2004 | Sikora |
| 2004/0059474 A1 | 3/2004 | Boorman |
| 2004/0095466 A1 | 5/2004 | Galasso |
| 2004/0111192 A1 | 6/2004 | Naimer et al. |
| 2004/0183697 A1 | 9/2004 | Rogers et al. |
| 2004/0254691 A1 | 12/2004 | Subelet |
| 2005/0143871 A1 | 6/2005 | Boorman et al. |
| 2005/0178903 A1 | 8/2005 | Boorman et al. |
| 2006/0004496 A1 | 1/2006 | Tucker et al. |

FOREIGN PATENT DOCUMENTS

| | | |
|---|---|---|
| EP | 0 286 120 | 10/1988 |
| EP | 0 370 640 | 5/1990 |
| EP | 0 489 521 | 6/1992 |
| EP | 1273987 | 1/2003 |
| FR | 2817831 | 6/2002 |
| FR | 2848306 | 6/2004 |
| GB | 886136 | 1/1962 |
| WO | WO-02/24530 | 3/2002 |
| WO | WO-2004/027732 | 4/2004 |

OTHER PUBLICATIONS

Painter et al., "Decision Support For the General Aviation Pilot," Systems, Man, and Cybernetics, IEEE International Conference on Computational Cybernetics and Simulation, Orlando, FL, Oct. 12-15, 1997, pp. 88-93.

777 Flight Deck (1 page); http://www.meriweather.com/777/777_main.html; [Accessed Jan. 28, 2003].

Lindenfeld, Ron, "What is an FMS?", Flight Management Systems (5 pages); http://www.ultranet.com/~marzgold//FAQ-FMS.html; [Accessed Jun. 3, 2002].

Meriweather's Flight Deck Acronyms & Definitions (4 pages); http://www.meriweather.com/fd/def.html; [Accessed Jun. 3, 2002].

Hutchins, Edwin, "The Integrated Mode Management Interface," Department of Cognitive Science, University of California, San Diego, Sep. 17, 1996.

PCT International Search Report and Written Opinion for PCT/US2005/010335; dated Nov. 30, 2006; European Patent Office; 13 pgs.

NASA, F-18 Cockpit, 1995, <http://www.dfrc.nasa.gov/gallery/Photo/F-18Chase/Medium/EC95-43155-7.jpg>, accessed Aug. 14, 2007.

Deltasoft, F-15 Cockpit, Aug. 2001, <http://web.archive.org/web/20010803031953/http://deltasoft.fife.wa.us/cockpit.htm> accessed Aug. 14, 2007.

* cited by examiner

METHODS AND SYSTEMS FOR CONTROLLING THE DISPLAY OF INFORMATION AT AN AIRCRAFT FLIGHT DECK

TECHNICAL FIELD

The present invention is directed generally toward methods and systems for controlling the information displayed at an aircraft flight deck.

BACKGROUND

Modern commercial aircraft make extensive use of computer systems to control aircraft behavior, plan and execute flights, and display information to the pilots during flight operations. FIG. 1 illustrates a flight deck 40 of a Boeing 777 aircraft having a forward instrument panel 46 and a control pedestal 45 configured in accordance with the prior art. Instruments 44 and display screens 20 are distributed over the forward instrument panel 46 and the control pedestal 45 for easy access by the pilots. The display screens 20 can include primary flight displays (PFDs) 21, an engine display 27, and three multi-function displays (MFDs) 22. The MFDs 22 can present additional aircraft flight information, including navigation displays 30, aircraft checklists, communication displays, and system status information.

Additional instrumentation is presented at a mode control panel (MCP) 41 positioned on a glare shield 42 of the flight deck 40, and at control and display units (CDUs) 47 positioned on the control pedestal 45. The glare shield 42 can also include a display select panel 48 having three display switches 59, one for each of the MFDs 22. A series of selector switches 60 each identify one type of available information to be displayed at the MFDs 22 (e.g., one selector switch 60 identifies the electronic checklist, another identifies the navigation display, and still another identifies the communications display).

In operation, the pilot first depresses one of the display switches 59 to select a particular one of the MFDs 22. Then the pilot presses one of the selector switches 60 to determine what type of information will be displayed at the-selected MFD 22. One drawback with this arrangement is that, on occasion, the pilot may press a selector switch 60 without realizing that a display switch 59 had previously been selected and that the previously selected display switch corresponds to an MFD 22 other than the one the pilot wishes to control. Accordingly, it may take additional time for the pilot to first determine that the appropriate display switch 59 must be pressed before pressing a corresponding one of the selector switches 60.

Another feature of the arrangement described above reference to FIG. 1 is that while the display screens 20 provide all the information the pilots require for flight operations, pilots are continually seeking additional information and additional flexibility and predictability in the way the information is presented. Accordingly, it may be desirable to provide the pilot with additional information and additional options for displaying the information.

SUMMARY

The present invention is directed toward methods and systems for displaying aircraft operations information on board an aircraft. A method in accordance with one aspect of the invention includes receiving operations information and presenting a first portion of the operations information over a first area of a display medium, the first area having a first size. The method can further include receiving a signal corresponding to an instruction to increase a fraction of the display medium occupied by the operations information, and presenting at least the first portion of the operations information over a second area of the display medium. The second area can have a second size greater than the first size (e.g., double the first size).

An apparatus in accordance with another aspect of the invention includes a first selector portion having a plurality of first settings, with individual first settings corresponding to categories of aircraft operations information. A menu display can be operatively coupled to the first selector portion and can be configured to present groups of selectable options, with individual groups corresponding to individual categories of aircraft operations information. The apparatus can further include a second selector portion at least proximate to the first selector portion, with the second selector portion having a plurality of second settings. Individual second settings can correspond to individual selectable options presented at the menu display. In particular embodiments, multiple first and second selector portions can be paired, with each pair dedicated to a different display medium.

DETAILED DESCRIPTION

The following disclosure describes systems and methods for displaying aircraft operations information aboard an aircraft. Certain specific details are set forth in the following description and in FIGS. 2-7B to provide a thorough understanding of various embodiments of the invention. Well-known structures, systems and methods often associated with displaying information have not been shown or described in detail below to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, such as routines executed by a programmable computer (e.g., a flight guidance computer). Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein includes any processor and can include Internet appliances, hand-held devices (including palm-top computers, wearable computers, cellular or mobile phones, multiprocessor systems, processor-based or programmable consumer electronics, mini-computers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic or optically readable computer disks (e.g., removable disks), as well as distributed electronically over networks. Data structures and transmissions of data particular to aspects of the invention are also encompassed within the scope of the invention.

Figure 1:
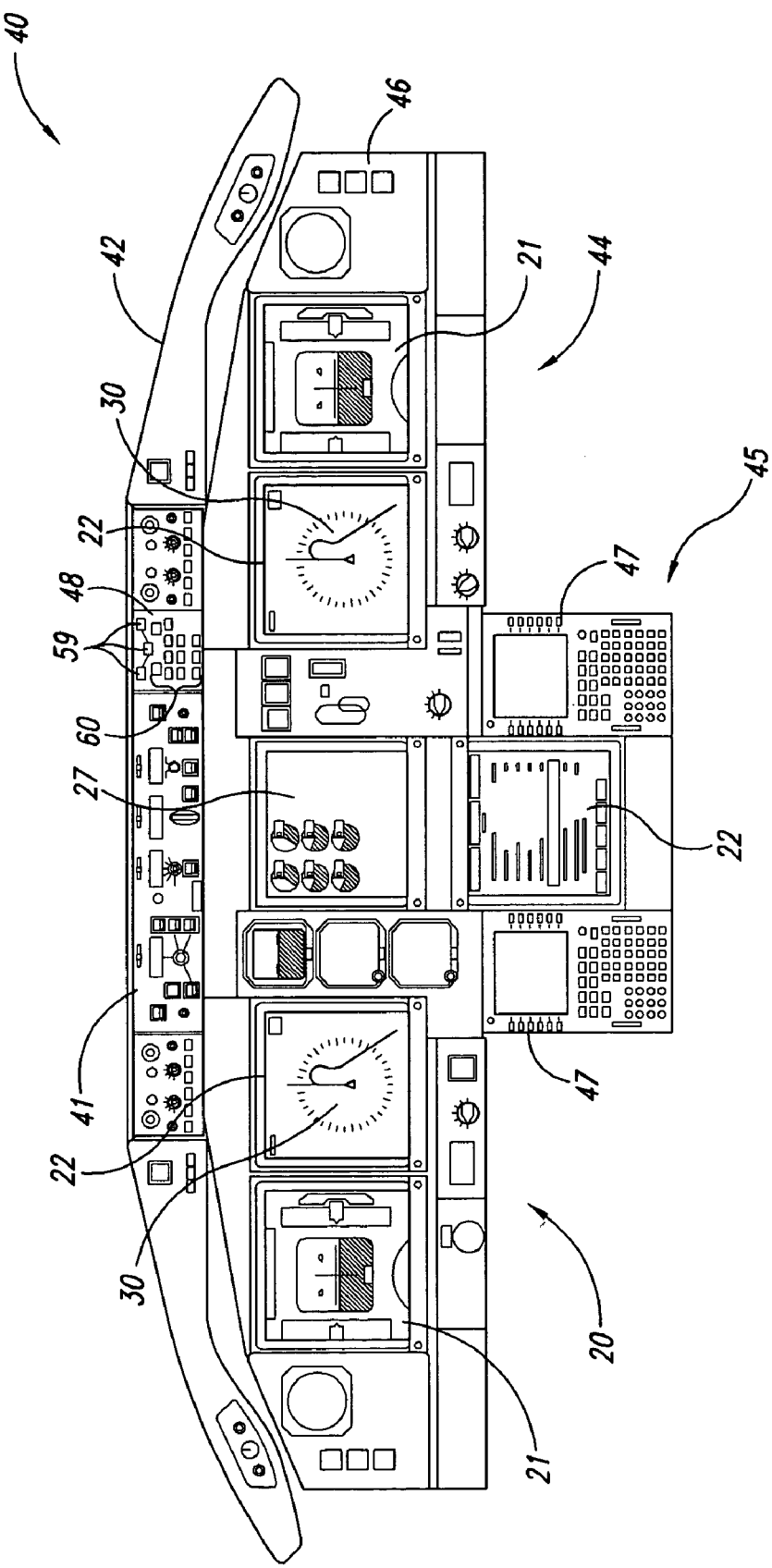
FIG. 1 is partially schematic illustration of a flight deck having displays and controls configured in accordance with the prior art.
Figure 2:
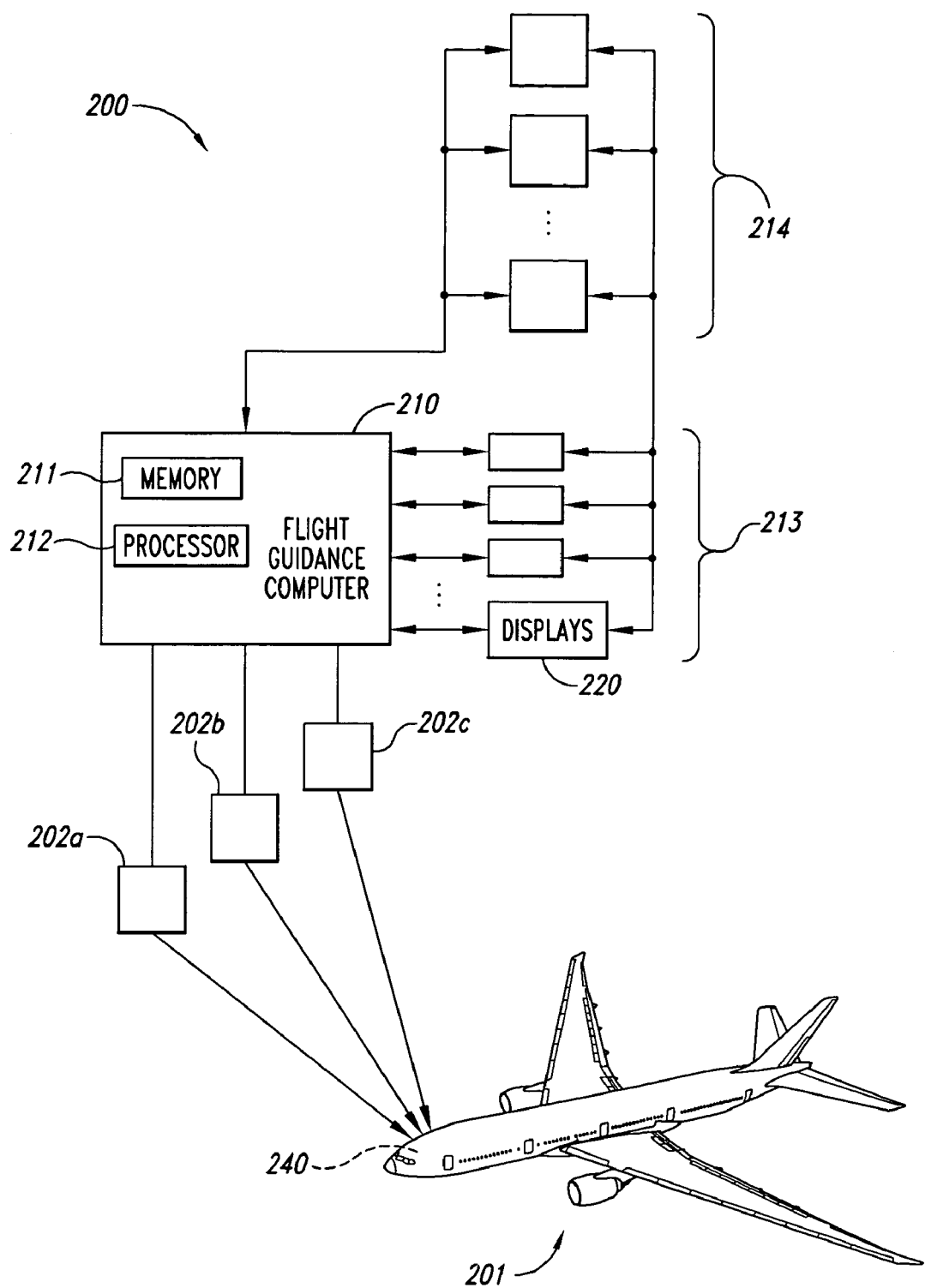
FIG. 2 illustrates a system for controlling displays on an aircraft in accordance with an aspect of the invention.

FIG. 2 is a schematic illustration of an aircraft 201 having a system 200 configured to display and receive information in accordance with an embodiment of the invention. Portions of the system 200 can be housed at a flight deck 240 of the aircraft 201 for access by an operator (e.g., a pilot). In one aspect of this embodiment, the system 200 can include input/output devices 213 via which the operator and can provide information to a computer (e.g., a flight guidance computer 210). Information can also be provided to the flight guidance computer 210 via subsystems, including sensors.

The flight guidance computer 210 can include a flight management computer, autoflight computer, autopilot and/or autothrottle and can be linked to one or more aircraft control systems 202, shown in FIG. 2 as a lateral motion or roll control system 202a, a vertical motion control system 202b, and an airspeed or engine control system 202c to control the aircraft direction, altitude and speed. The flight guidance computer 210 can include a memory 211 and a processor 212 for processing the information received. The information can be presented to the operator at a plurality of displays 220. The system 200 can include other computers and/or subsystems 214 that control additional functions and/or supplement functions carried out by the flight guidance computer 210. These functions can include navigation functions, communication functions, electronic checklist functions, among others. The other computers 214 can be linked to the flight guidance computer 220 and the input/output devices 213, including the displays 220. The amount of information presented at each display 220, the display area occupied by the information, and the particular display 220 at which the information is presented can all be controlled by the operator in an intuitive manner. Accordingly, the operator can view information and change the type of information presented at the displays in a manner that is more complete, more flexible and yet simpler than methods available with existing systems, as described below.

Figure 3:
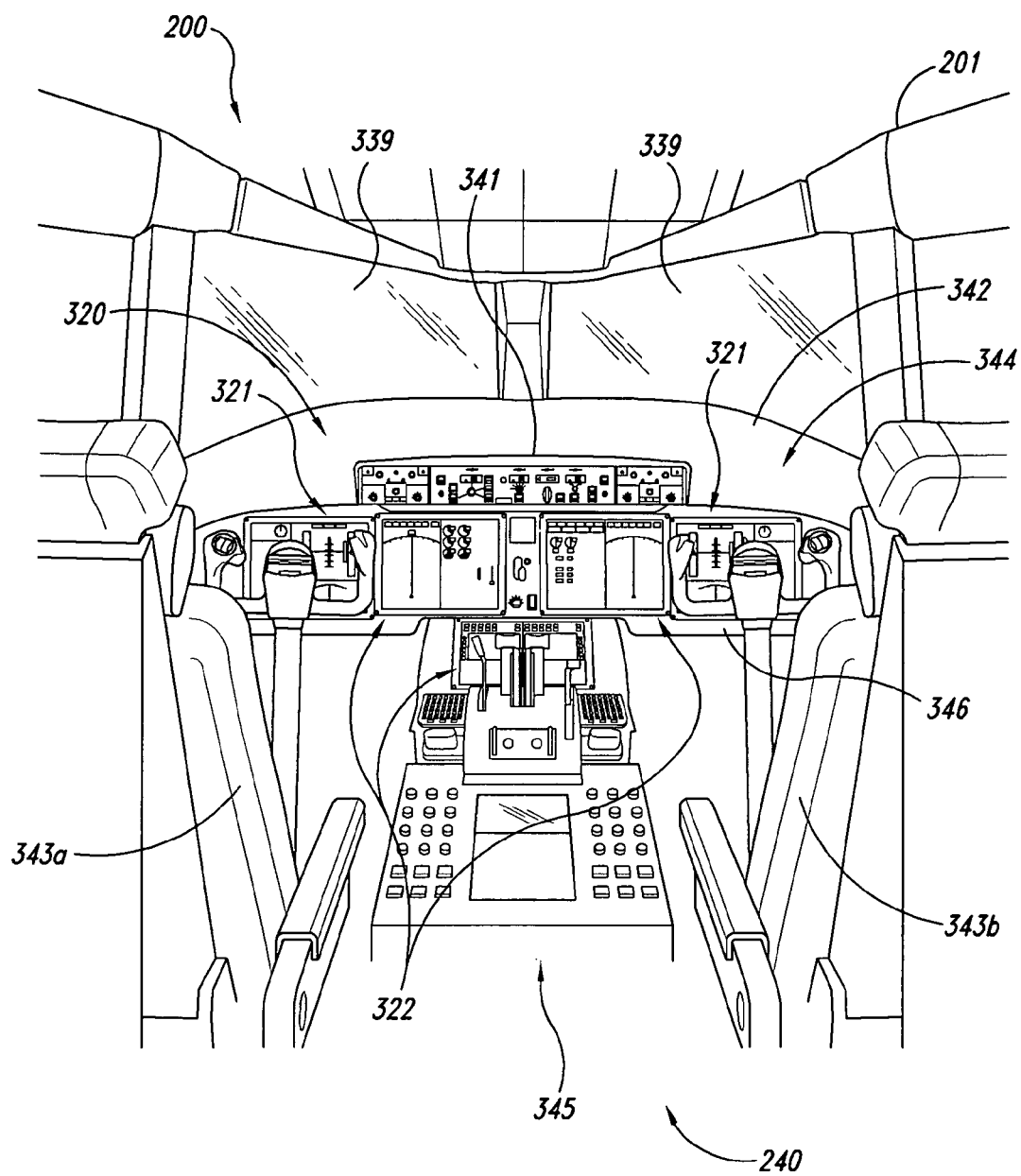
FIG. 3 illustrates a flight deck having displays configured in accordance with an embodiment of the invention.

FIG. 3 illustrates further details of an embodiment of the flight deck 240 described above. The flight deck 240 can include forward windows 339 providing a forward field of view from the aircraft 201 for operators seated in a first seat 343a and/or a second seat 343b. In other embodiments, the forward windows 339 can be replaced with one or more external vision screens that include a visual display of the forward field of view out of the aircraft 201. A glare shield 342 can be positioned adjacent to the forward windows 339 to reduce the glare on one or more flight instruments 344 and displays 320 positioned on a control pedestal 345 and a forward instrument panel 346. The glare shield 342 can also house a mode control panel (MCP) 341 positioned above the displays 320. The displays 320 can include primary flight displays (PFDs) 321 that provide the operators with actual flight parameter information (e.g., flight attitude, airspeed and altitude), and multifunction displays (MFDs) 322 that display other operator-selectable information.

Figure 4:
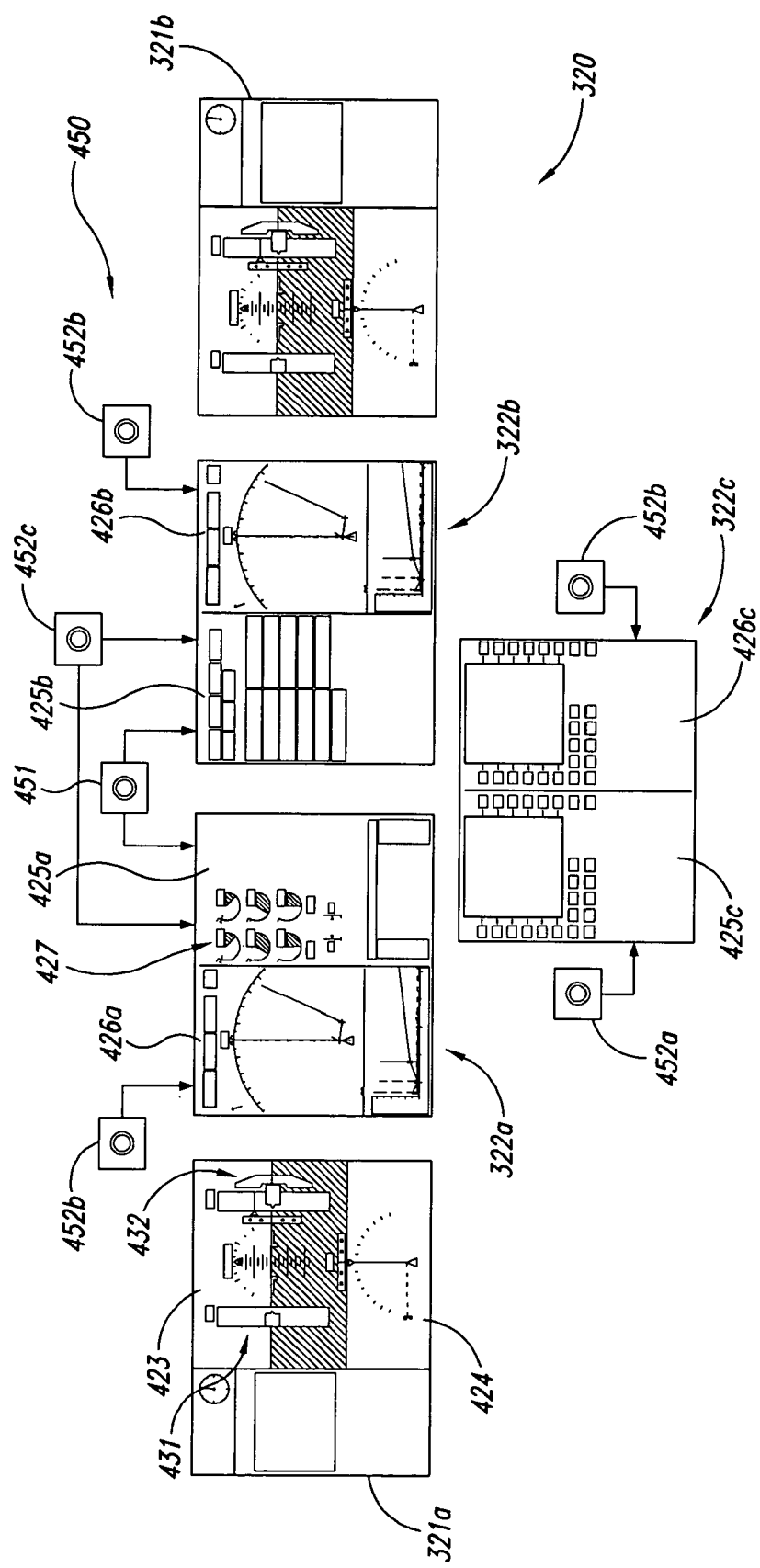
FIG. 4 illustrates displays and corresponding selectors in accordance with an embodiment of the invention.

FIG. 4 illustrates further details of embodiments of the displays 320 described above, along with selectors 450 for controlling the type of information presented at the displays 320, and the manner in which the information is presented. The displays 320 can include two PFDs 321 (shown as a first PFD 321a and a second PFD 321b). The PFDs can present an attitude indicator 423 superimposed on airspeed indicator 431 and an altitude indicator 432, along with a small plan view map 424, which indicates the aircraft's current direction. The primary flight display 321 can also include a clock and ATC uplink message box.

The displays 320 can further include three MFDs 322, shown as a first or left MFD 322a, a second or right MFD 322b, and a third or lower MFD 322c. Each MFD 322 can have a first portion 425 (shown as first portions 425a-425c) and a second portion 426 (shown as second portions 426a-426c). In one embodiment, each portion 425, 426 can occupy approximately half the display area available at each MFD 322, and in other embodiments, the portions can occupy different fractional amounts of the available display area. In any of these embodiments, the information presented on one portion can be entirely independent of the information presented in the other. In other embodiments, the two portions can be combined to display information in a larger format. The manner in which the information is presented can be controlled by the selectors 450, as described in greater detail below.

The selectors 450 can include MFD selectors 452 (shown in FIG. 4 as first MFD selectors 452a, second MFD selectors 452b, and an alternating MFD selector 452c). The first MFD selectors 452a can be operatively coupled to the first portions 425 of the MFDs 322 and the second MFD selectors 452b can be operatively coupled to the second portions 426 of the MFDs 322. For example, a first MFD selector 452a can be operatively coupled to the first portion 425c of the lower MFD 322c, and a second MFD selector 452b can be operatively coupled to the second portion 426c of the same MFD 322c. Additional second MFD selectors 452b can also be coupled to the second portion 426a of the left MFD 322a, and to the second portion 426b of the right MFD 322b.

In one embodiment, the arrangement for the first portions 425a, 425b of the left and right MFDs 322a, 322b can be different than the arrangement described above for the lower MFD 322c. For example, the first portions 425a, 425b can be arranged so that one portion always presents an engine display 427 (e.g., a display of engine operating parameters). An engine display selector 451 can be operatively coupled to both the left MFD 322a and the right MFD 322b to control which MFD presents the engine display 427. By placing the engine display selector 451 at a first setting, the engine display 427 is presented at the first portion 425a of the left MFD 322a, and by placing the engine display selector 451 at a second setting, the engine display 427 is presented at the first portion 425b of the right MFD 322b. In this manner, the engine display 427 is always presented to the operators, but space remains available at both the left MFD 322a and the right MFD 322b to present operator selectable information as well. In particular, the information presented at the second portions of each of these MFDs 322a, 322b (neither of which is occupied by the engine display 427) can be controlled by the corresponding second MFD selectors 452b, as described above. The information presented at the first portion that is not occupied by the engine display 427 can be controlled by the alternating MFD selector 452c.

Figure 5A:
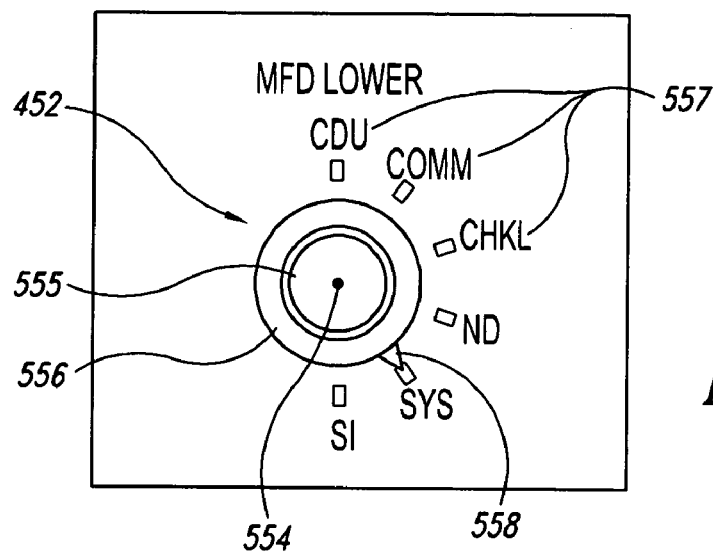
FIGS. 5A-5B illustrate details of a selector and display portion configured in accordance with an embodiment of the invention.
Figure 5B:
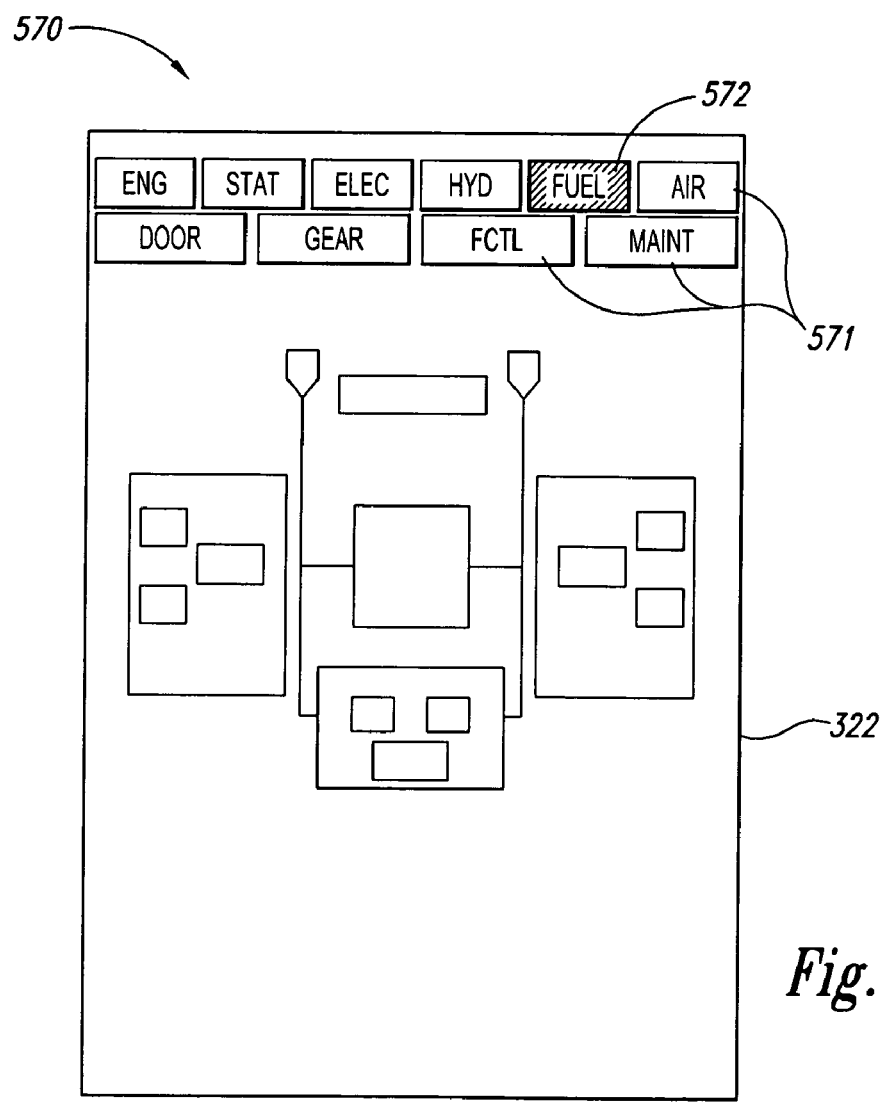

FIGS. 5A and 5B illustrate one of the MFD selectors 452 described above, along with a corresponding MFD 322 displays illustrating how the MFD selector 452 operates. Each MFD selector 452 can include an inner portion 555 and an outer portion 556, both of which are independently rotatable about a rotation axis 554. The outer portion 556 can include a pointer 558 which can be aligned with a plurality of settings 557 (indicated by shorthand textual messages in FIG. 5A). Each setting 557 can correspond to a category of information presented at the corresponding MFD portion 426. For example, "CDU" can correspond to a control and display unit display, "COMM" can correspond to a communications display, "CHKL" can correspond to a checklist display, "ND" can correspond to a navigation display, "SYS" can correspond to a systems synoptics display, and "Si" can correspond to a supplemental information display. The operator can select which category of information is to be presented at the corresponding display portion by rotating the outer portion 556 of the MFD selector 452 to the appropriate setting 557.

Once the operator has selected one of the settings 557, the system can present a corresponding menu display 570 having a plurality of selectable options 571. The operator can rotate the inner portion 555 to sequentially highlight selectable options. For example, when the outer portion 556 of the MFD selector 452 is on the "SYS" setting, the menu display 570 presents selectable options 571 corresponding to a variety of aircraft systems. As the operator rotates the inner portion 555, successive selectable options 571 are highlighted (as indicated by highlighted option 572, "FUEL"). When the operator provides an additional signal (e.g., by pressing or pulling the inner portion 555 axially along the rotation axis 554), the highlighted option 572 is presented at the corresponding portion of the MFD. For example, as shown in FIG. 5B, the MFD 322 can present a graphic illustration of the fuel system. In other embodiments, other devices can perform the functions performed by the inner portion 555, in conjunction with or in lieu of the inner portion 555. For example, these functions can be performed by a cursor control device (e.g., located at the control pedestal 345 described above with reference to FIG. 3).

One feature of embodiments of the system described above with reference to FIGS. 2-5B is that each MFD 322 can include two independently controllable portions. An advantage of this arrangement is that each MFD 322 can present more information to the operator without eliminating information already presented to the operator. Accordingly, the operator has more information at his or her disposal when operating the aircraft. Another advantage of this feature is that if one display medium becomes faulty and is unable to present information, more options are available for presenting the information because each remaining MFD can present two types of information independently.

Another feature of the foregoing embodiments described above with reference to FIGS. 2-5B is that each portion of the MFD 322 can have a dedicated MFD selector 452. An advantage of this arrangement is that it can reduce operator confusion by clearly and visually coupling a particular MFD selector 452 with a particular portion of the corresponding MFD 322.

Figure 6A:
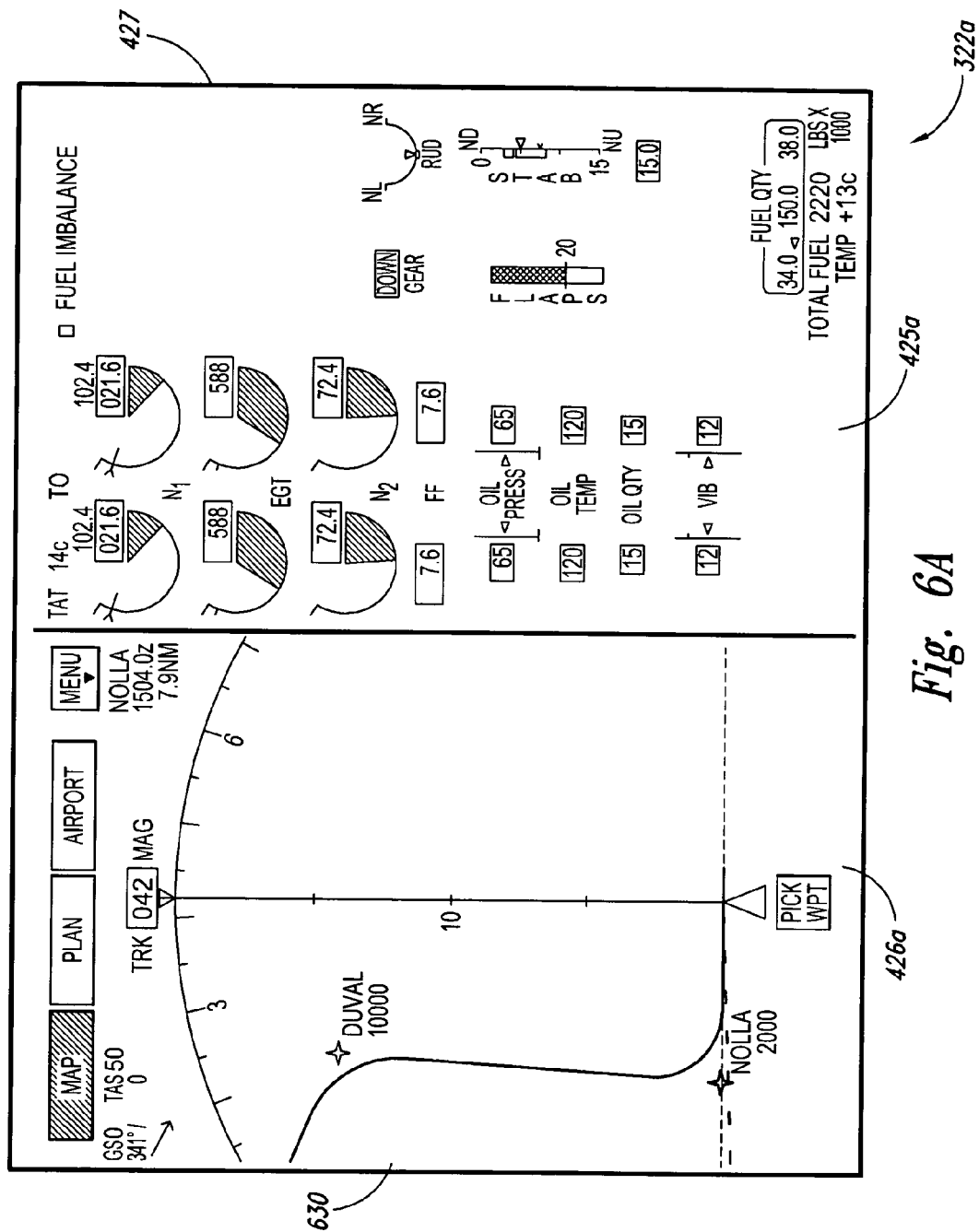
FIGS. 6A-6G illustrate information presented at aircraft displays in accordance with further embodiments of the invention.
Figure 6B:
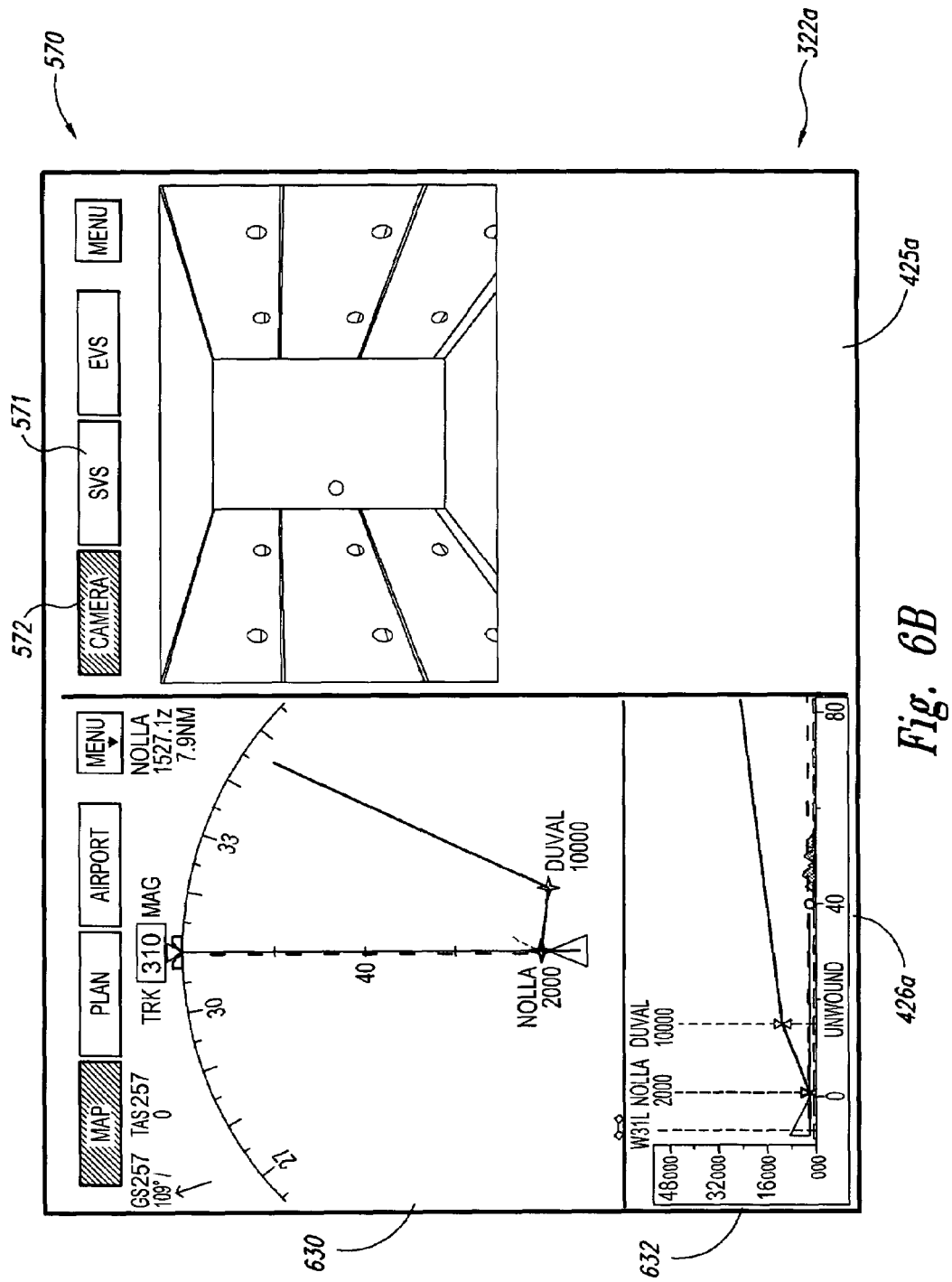

FIGS. 6A-6G illustrate information presented at one of the MFDs 322 (e.g., the first MFD 322a) in accordance with several embodiments of the invention. In an embodiment shown in FIG. 6A, the first portion 425a presents the engine display 427. The engine display 427 can include an "EICAS" display containing standard engine operating data, engine alert instrumentation and other related data. The second portion 426a can present a navigation display 630, indicating aircraft heading and track relative to a compass rosette. In FIG. 6B, the engine display 427 has shifted to the second MFD 322b (FIG. 4), allowing the operator to select different information to be presented at the first portion 425a. The operator in this case has selected supplemental information (SI) to be displayed at the first portion 425a. The menu display 570 associated with this category of information presents selectable options 571, including a highlighted option 572 corresponding to a camera view of the galley area, which appears at the first portion 425a. The operator has selected the second portion 426a to present a navigation display 632, including a vertical situation display 632, that indicates the track of the aircraft over the terrain below.

Figure 6C:
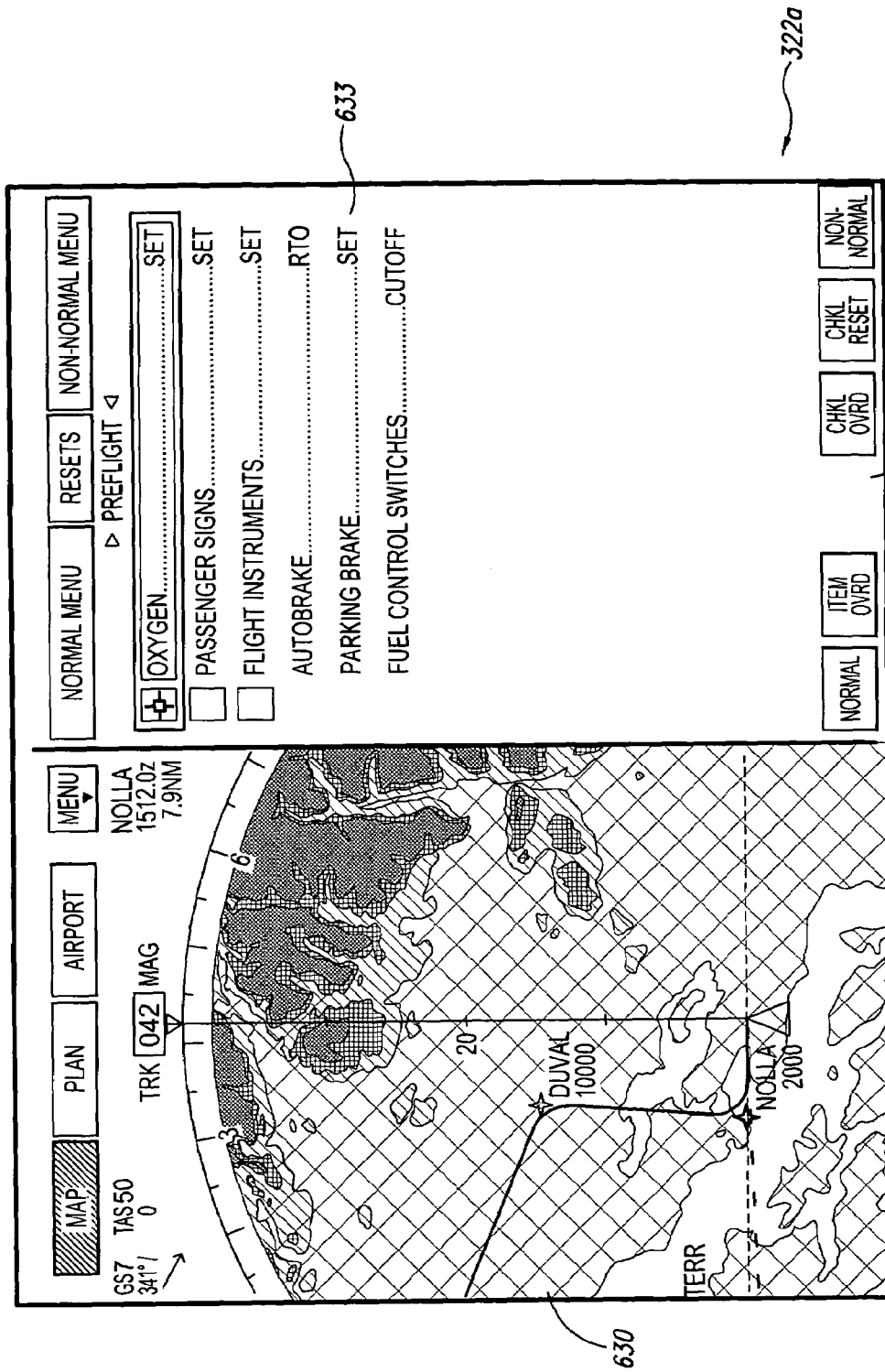
Figure 6D:
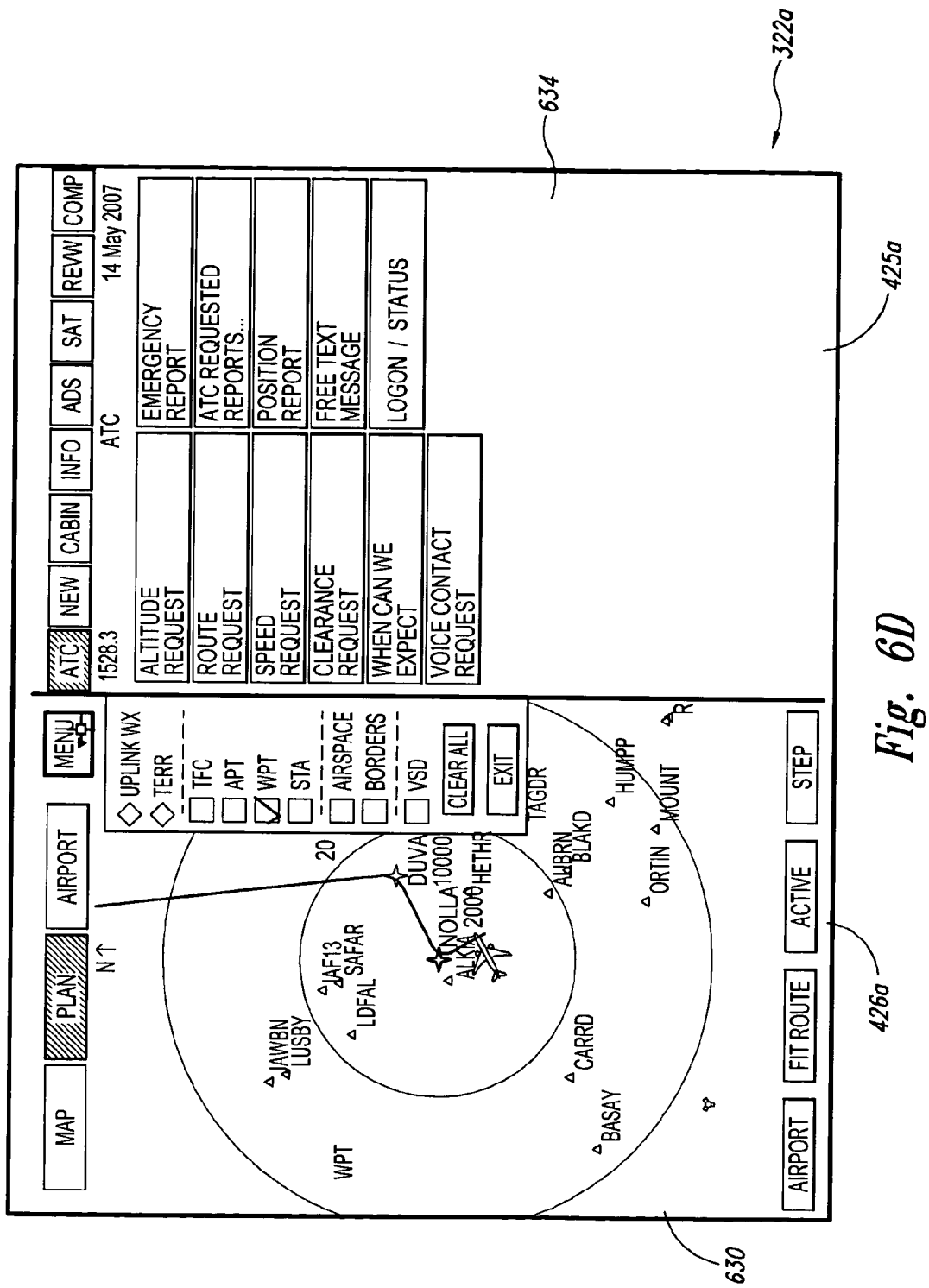

In FIG. 6C, the operator has selected to display a checklist 633 at the first portion 425a, and a navigational display 630 at the second portion 426a. In this particular embodiment, the operator has selected a preflight checklist for display at the first portion 425a, and a map that indicates, in color-coded contour fashion, the terrain below the aircraft along the upcoming course. The capability to present the terrain display can be installed in the aircraft at the option of the owner. In FIG. 6D, the operator has selected the first portion 425a to present a communication display 634 (in particular, an ATC communication display). The operator has selected the second portion 426a to present a plan view navigation display, presenting the aircraft, the upcoming course and surrounding waypoints, but without the compass rosette shown in FIGS. 6A-6C.

Figure 6E:
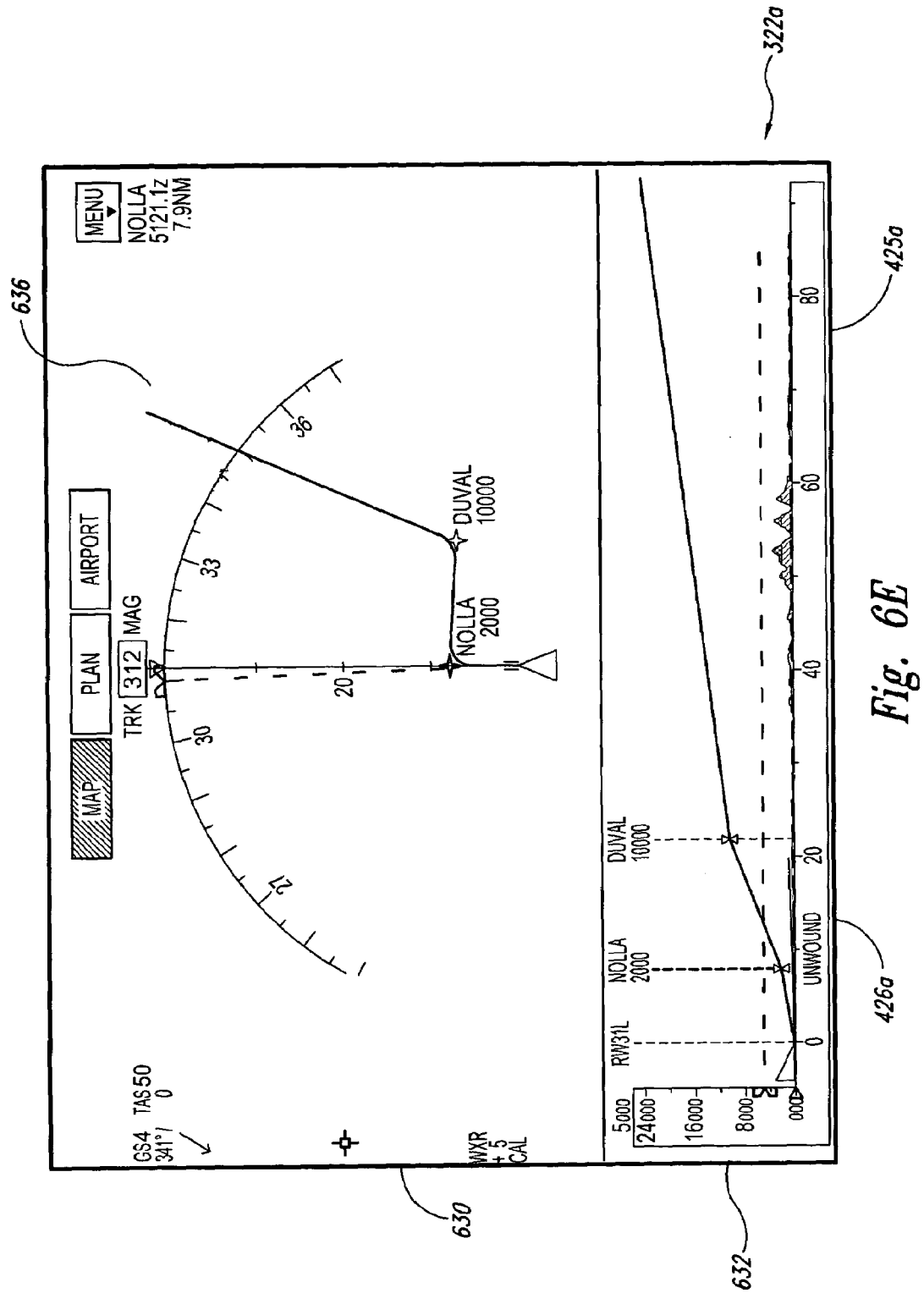
Figure 6F:
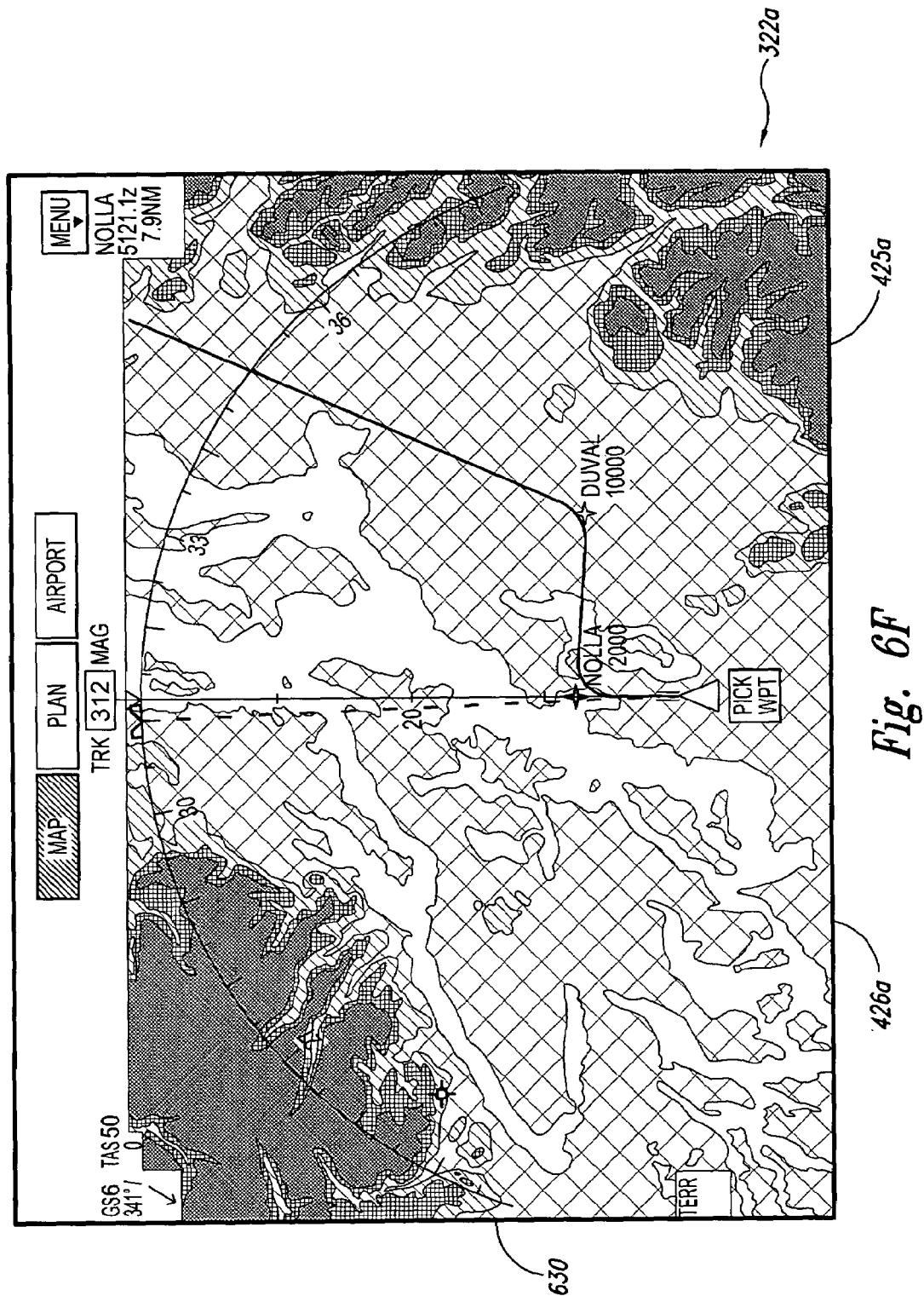

FIGS. 6E and 6F illustrate the MFD 322a after the operator has selected both the first portion 425a and the second portion 426a to present the same information, in accordance with an embodiment of the invention. In this particular embodiment, the operator has selected both portions 425a, 426a to present a navigation display 630 along with a vertical situation display 632. Accordingly, the MFD 322a presents an enlarged compass rosette and an enlarged vertical situation 632 display, each of which cover both the first portion 425a and the second portion 426a of the MFD 322a. An advantage of this arrangement is that the combined display can present more information than a single "half width" display. For example, the combined display shown in FIG. 6E can present an approximately 121 degree compass rosette, while the half width map shown in FIG. 6B presents an approximately 90 degree compass rosette. Aspects of the vertical situation display 632 may also be easier to read when presented in the larger format shown in FIG. 6E. The operator can also view weather information (e.g., color-coded contours 636) by activating a hardware or software switch.

FIG. 6F illustrates an arrangement generally similar to that described above with reference to FIG. 6E but with the vertical situation display eliminated, and with surface contours illustrated. Because the vertical situation display 632 is not presented at the MFD 322a, the presented compass rosette can be increased even further, for example, to approximately 142 degrees.

Figure 6G:
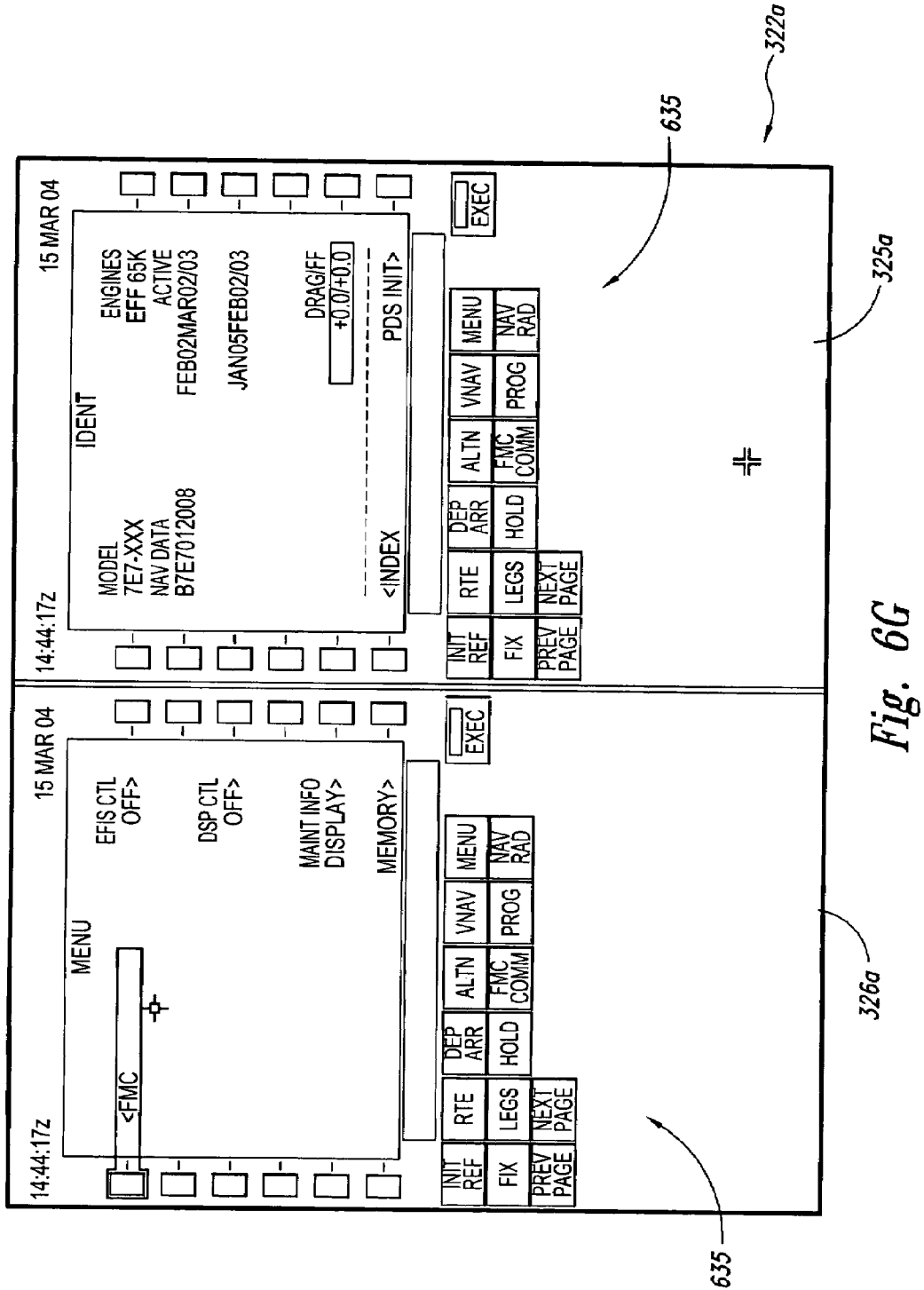

FIG. 6G illustrates the MFD 322a presenting CDU information 635 (e.g., information typically presented at an aircraft control and display unit), in accordance with another aspect of the invention. This information is typically presented at the third or lower MFD 322*c*, but can be presented at either of the other two MFDs 322*a*, 322*b*, depending on which MFD is not currently presenting the engine display 327. The CDU information 635 can include displayed selectors in lieu of hardware switches, and can further include enlarged display fields for presenting error messages in the event the operator enters erroneous information. Aspects of both features are described in further detail in pending U.S. application Ser. No. 10/814,494 and U.S. application Ser. No. 10/814,369, both filed concurrently herewith and both incorporated herein in their entireties by reference.

In any of the embodiments described above with reference to FIGS. 4-6G, the airline or other aircraft owner can modify the information presented at any of the MFDs 322. For example, the aircraft owner can request that contour lines, geopolitical boundaries and/or other information be presented at a navigation display. In other embodiments, the aircraft owner can add information or categories of information before or after purchasing the aircraft. For example, referring now to FIGS. 5A-5C, the aircraft owner can request that the supplemental information category ("SI") include additional selectable options, which can be presented at the menu display 570. The menu display 570 can be driven by modifiable, computer-implemented instructions, and accordingly, additions, deletions and/or modifications can be easily made without requiring hardware changes at the aircraft flight deck.

Figure 7A:
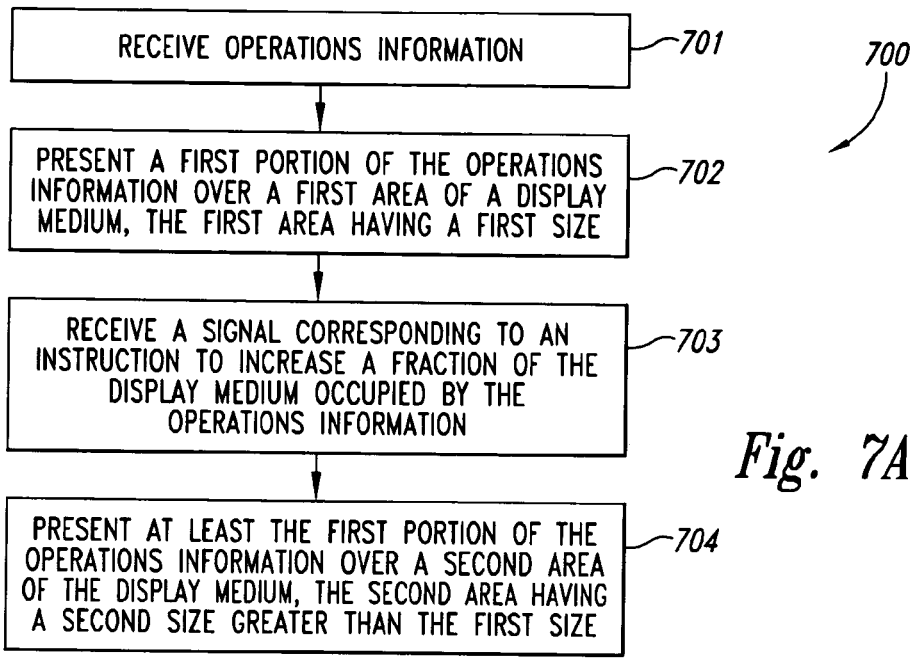
FIGS. 7A-7B illustrate flow charts corresponding to methods in accordance with embodiments of the invention.
Figure 7B:
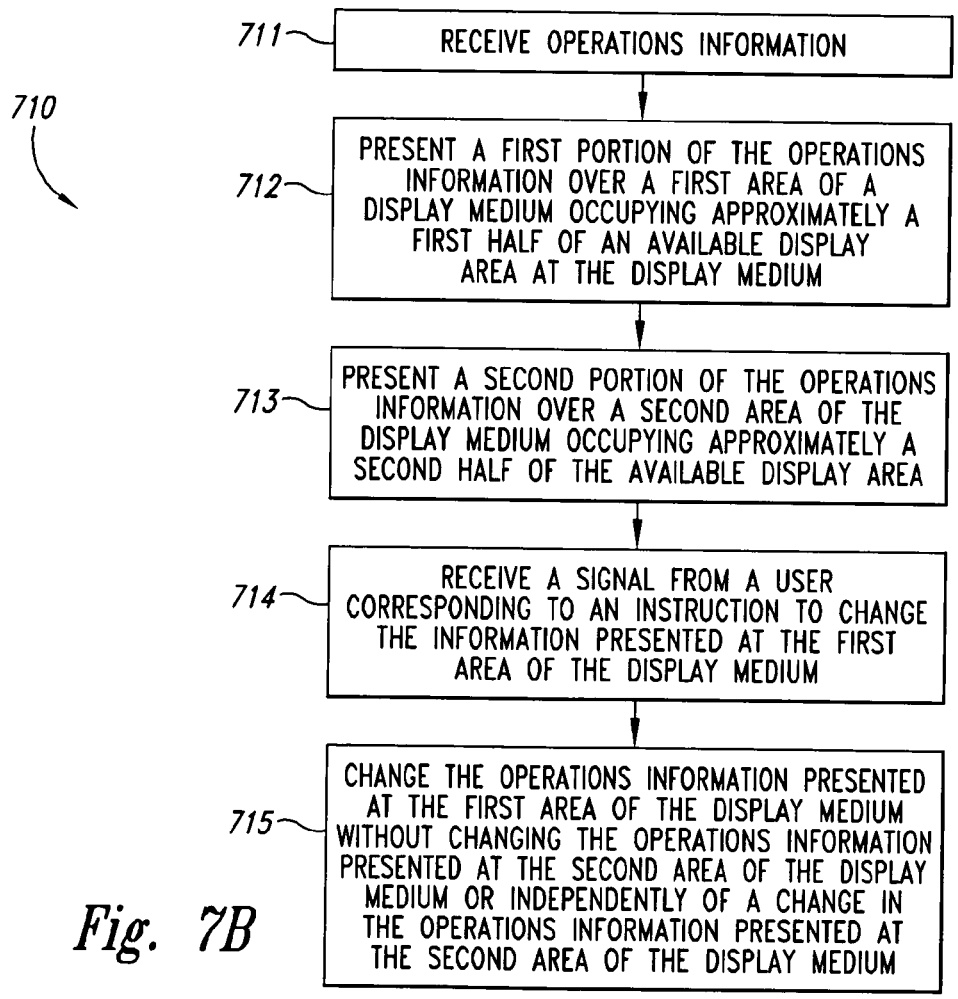

FIGS. 7A-7B illustrate flow charts corresponding to processes conducted in accordance with further embodiments of the invention. Referring first to FIG. 7A, a process 700 can include receiving operations information (process portion 701) and presenting a first portion of the operations information over a first area of a display medium having a first size (process portion 702). For example, process portion 702 can include presenting navigation, communication, or other information over half an available area of one of the MFDs 322. The process 700 can further include receiving a signal corresponding to an instruction to increase a fraction of the display medium occupied by the operations information (process portion 703). For example, when the operator selects the first and second portions of a single multifunction display 322 to present the same information, this action can correspond to an instruction to increase the fraction of the display medium occupied by the operations information. In process portion 704, the system can present at least the first portion of the operations information over a second area of the display medium having a second size greater than the first size. For example, process portion 704 can include presenting not only the same amount of information presented in process portion 702, but also additional information. Referring specifically to FIGS. 6B and 6E, process portion 704 can include presenting navigational information over an increased compass rosette area.

Referring now to FIG. 7B, a process 710 in accordance with another embodiment of the invention can include receiving operations information (process portion 711) and presenting a first portion of the operations information over a first area of a display medium occupying approximately half an available area of the display medium (process portion 712). The process 710 can further include presenting a second portion of the operations information over a second area of the display medium occupying approximately a second half of the available display area. In process portion 714, the process 710 can include receiving a signal from a user corresponding to an instruction to change the information presented at the first area of the display medium. For example, when the operator changes the position of the MFD selector 452 described above, this action can transmit the appropriate signal to the system. The system can then change the operations information presented at the first area without changing the operations information presented at the second area, or independently of a change in the operations information presented at the second area (process portion 715). For example, the system can present a systems status diagram at one portion without changing a navigation display at another portion. Alternatively, the system can present the systems status information at one portion while independently updating the navigation display at another portion to reflect changes in the course of the aircraft.

From the foregoing, it will be appreciated that specific embodiments of the invention have been described herein for purposes of illustration, but that various modifications may be made without deviating from the spirit and scope of the invention. For example, the enlarged displays described above in the context of navigation displays can also be presented in the context of other displays, e.g., textual displays. The content of particular displays described above are provided merely for illustrative purposes. In other embodiments, the display media described above can present information other than that shown in the figures. In still further embodiments, aspects of the invention described in the context of particular embodiments can be eliminated or combined. Accordingly, the invention is not limited except as by the appended claims.

We claim:

1. A method for displaying aircraft operations information onboard an aircraft, comprising:
   receiving operations information;
   presenting a first portion of the operations information over a first area of a display medium, the first area having a first size;
   receiving a signal corresponding to an instruction to increase a fraction of the display medium occupied by the operations information; and
   presenting at least the first portion of the operations information over a second area of the display medium, the second area having a second size greater than the first size and includes at least approximately the entire display area of the display medium.

2. The method of claim 1 wherein presenting at least the first portion of the operations information over a second area of the display medium includes presenting at least the first portion of the operations information over a second area that includes the first.

3. The method of claim 1 wherein presenting at least the first portion of the operations information over a second area includes presenting the first portion of the operations information and a second portion of the operations information over the second area.

4. The method of claim 1 wherein the operations information includes navigation information, and wherein the first portion includes a map covering a first geographical region, and wherein presenting at least the first portion of the operations information over a second area includes presenting a map covering a second geographical region larger than the first geographical region.

5. The method of claim 1 wherein presenting at least the first portion of the operations information over a second area includes presenting at least the first portion over a second area of the display medium having a second size at least approximately double the first size.

6. The method of claim 1 wherein presenting a first portion of the operations information over a first area of a display medium includes presenting a first category of operations information over the first area of the display medium, and wherein the method further comprises:

presenting a second category of operations information over at least a portion of a remaining area of the display medium; and updating the information presented over the first area and the remaining area.

7. The method of claim 1 wherein the display medium includes a second one of two display media, and wherein the method further comprises determining that a first one of the two display media is faulty, prior to presenting the operations information at the second display medium.

8. A method for displaying aircraft operations information onboard an aircraft, comprising:

receiving navigational information corresponding to a location of an aircraft;

presenting a first portion of the navigational information over a first area of a display medium, the first area of the display medium covering approximately half an available area of the display medium, the first portion of the navigational information including an indication of the location of the aircraft and a map covering a first region;

receiving a signal corresponding to an instruction to increase a fraction of the display medium occupied by the navigational information; and presenting a second portion of the navigational information over a second area of the display medium covering at least approximately the entire available area of the display medium, the second portion of the navigation information including an indication of the location of the aircraft and a map covering a second region larger than the first region.

9. The method of claim 8 wherein the display medium includes a second one of two display media, and wherein the method further comprises determining that a first one of the two display media is faulty, prior to presenting the operations information at the second display medium.

10. A computer-readable medium for displaying aircraft operations information onboard an aircraft by carrying out a method, comprising:

receiving operations information;

presenting a first portion of the operations information over a first area of a display medium, the first area having a first size;

receiving a signal corresponding to an instruction to increase a fraction of the display medium occupied by the operations information; and presenting at least the first portion of the operations information over a second area of the display medium, the second area having a second size greater than the first size and including at least approximately the entire display area of the display medium.

11. The computer-readable medium of claim 10 wherein presenting at least the first portion of the operations information over a second area of the display medium includes presenting at least the first portion of the operations information over a second area that includes the first area.

12. The computer-readable medium of claim 10 wherein presenting at least the first portion of the operations information over a second area includes presenting the first portion of the operations information and a second portion of the operations information over the second area.

13. The computer-readable medium of claim 10 wherein the operations information includes navigation information, and wherein the first portion includes a map covering a first geographical region, and wherein presenting at least the first portion of the operations information over a second area includes presenting a map covering a second geographical region larger than the first geographical region.

14. The computer-readable medium of claim 10 wherein presenting at least the first portion of the operations information over a second area includes presenting at least the first portion over a second area of the display medium having a second size at least approximately double the first size.

15. An aircraft, comprising:

a fuselage portion;

a wing portion; and a computer-readable medium for displaying aircraft operations information onboard an aircraft by carrying out a method, comprising:

receiving operations information;

presenting a first portion of the operations information over a first area of a display medium, the first area having a first size;

receiving a signal corresponding to an instruction to increase a fraction of the display medium occupied by the operations information; and presenting at least the first portion of the operations information over a second area of the display medium, the second area having a second size greater than the first size and includes at least approximately the entire display area of the display medium.

16. The aircraft of claim 15 wherein the operations information includes navigation information, and wherein the first portion includes a map covering a first geographical region, and wherein presenting at least the first portion of the operations information over a second area includes presenting a map covering a second geographical region larger than the first geographical region.

17. An apparatus for controlling information provided on board an aircraft, comprising:

a first manually rotatable selector portion having plurality of first settings, with individual first settings corresponding to categories of aircraft operations information;

a menu display operatively coupled to the first selector portion and configured to present groups of selectable options, with individual groups corresponding to individual categories of aircraft operations information; and a second manually rotatable selector portion at least proximate to the first selector portion, the second selector portion having plurality of second settings, with individual second settings corresponding to individual selectable options presented at the menu display.

18. The apparatus of claim 17 wherein the first selector portion is rotatable among the individual first settings.

19. The apparatus of claim 17 wherein the second selector portion is rotatable among the individual second settings.

20. The apparatus of claim 17 wherein the second selector portion is disposed radially inwardly from the first selector portion.

21. The apparatus of claim 17 wherein the first and second selector portions are independently rotatable about a common axis.

22. The apparatus of claim 17 wherein the second selector portion is rotatable among the individual second settings about a rotation axis and movable axially along the rotation axis to activate an individual selectable option presented at the menu display.

23. The apparatus of claim 17 wherein the menu display includes a display medium at which aircraft operations information corresponding to the selectable options is presented.

24. An aircraft, comprising:
 a fuselage portion;
 a wing portion, at least one of the wing portion and the fuselage portion including a flight deck, the flight deck including:
  a first manually rotatable selector portion having plurality of first settings, with individual first settings corresponding to categories of aircraft operations information;
  a menu display operatively coupled to the first selector portion and configured to present groups of selectable options, with individual groups corresponding to individual categories of aircraft operations information; and
  a second manually rotatable selector portion at least proximate to the first selector portion, the second selector portion having plurality of second settings, with individual second settings corresponding to individual selectable options presented at the menu display.

25. The aircraft of claim 24 wherein the menu display includes a display medium at which aircraft operations information corresponding to the selectable options is presented.

26. The aircraft of claim 24 wherein the second selector portion is rotatable among the individual second settings about a rotation axis and movable axially along the rotation axis to activate an individual selectable option presented at the menu display.

27. An apparatus for controlling information provided at an aircraft display medium, comprising:
 a first rotary switch portion rotatable about a rotation axis to a plurality of first positions, with individual first positions corresponding to categories of aircraft operations information;
 a menu display coupled to the first rotary switch portion and configured to present groups of selectable options, with individual groups of selectable options corresponding to individual categories of aircraft operations information;
 a second rotary switch portion disposed concentrically and inwardly from the first rotary switch portion to rotate about the rotation axis independently of the first rotary switch portion, the second switch portion having plurality of second positions and being operatively coupled to the menu display, with individual positions corresponding to individual selectable options presented at the menu display, the second rotary switch portion being movable axially along the rotation axis to select one of the selectable options when the second rotary switch is positioned at a corresponding second position.

28. The apparatus of claim 27 wherein the menu display includes a display medium at which aircraft operations information corresponding to the selectable options is presented.

29. A system for displaying aircraft operations information, comprising:
 first and second display media, each configured to present at least one of a plurality of different displays, with individual displays corresponding to individual categories of operations information;
 a processor configured to receive operations information;
 a first selection device coupled between the processor and first display medium, the first selection device having plurality of settings, with individual settings corresponding to categories of aircraft operations information available for display at the first display medium; and
 a second selection device coupled between processor and second display medium, the second selection device having plurality of settings, with individual settings corresponding to categories of aircraft operations information available for display at the second display medium; wherein
 the first selection device includes a first rotary switch portion rotatable about a rotation axis to a plurality of first positions, with individual first positions corresponding to categories of aircraft operations information; and
 the second selection device includes a second rotary switch portion disposed concentrically inwardly from the first rotary switch portion to rotate about the rotation axis independently of the first rotary switch portion, the second switch portion having plurality of second positions corresponding to individual selectable options available for at least one of the categories of aircraft operations information, the second rotary switch portion being movable axially along the rotation axis to select one of the selectable options when the second rotary switch is positioned at a corresponding second position.

30. A system for presenting aircraft operations information, comprising:
 a plurality of display media;
 a controller coupled to the display media, the controller being configured to:
  present flight instrument data on first and second display media;
  present engine and corresponding alert data at one of a third and a fourth display medium; and
  present selectable data on the other of the third and fourth display media;
 a manually rotatable first selector operatively coupled between the controller and the third and fourth display media to direct engine and corresponding alert data to the one of the third and the fourth display media; and
 at least one manually rotatable second selector operatively coupled to the third and fourth display media to direct selectable data to the other of the third and fourth display media.

31. The system of claim 30, further comprising:
 a first operator's seat; and
 a second operator's seat proximate to the first operator's seat, and wherein the first and third display media are positioned closer to the first operator's seat than to the second operator's seat.

32. The system of claim 30 wherein the plurality of display media includes a fifth display medium.

* * * * *

UNITED STATES PATENT AND TRADEMARK OFFICE
CERTIFICATE OF CORRECTION

| | | |
|---|---|---|
| PATENT NO. | : 7,321,318 B2 | Page 1 of 1 |
| APPLICATION NO. | : 10/815034 | |
| DATED | : January 22, 2008 | |
| INVENTOR(S) | : Crane et al. | |

It is certified that error appears in the above-identified patent and that said Letters Patent is hereby corrected as shown below:

On the face page, in field (56), under "U.S. Patent Documents", in column 1, line 5, delete "Dennnison" and insert -- Dennison --, therefor.

In column 1, line 42, delete "the-selected" and insert -- the selected --, therefor.

In column 5, line 23, delete ""Si"" and insert -- "SI" --, therefor.

In column 8, line 48, in Claim 2, delete "first." and insert -- first area. --, therefor.

Signed and Sealed this

Nineteenth Day of August, 2008

JON W. DUDAS
*Director of the United States Patent and Trademark Office*